US008688258B2

(12) United States Patent
Miller

(10) Patent No.: US 8,688,258 B2
(45) Date of Patent: Apr. 1, 2014

(54) METHOD OF CONTROLLING A MACHINE TOOL

(75) Inventor: John W. Miller, Waterford, MI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 278 days.

(21) Appl. No.: 12/208,724

(22) Filed: Sep. 11, 2008

(65) Prior Publication Data

US 2010/0063608 A1    Mar. 11, 2010

(51) Int. Cl.
G06F 19/00 (2011.01)
G05B 19/409 (2006.01)
G05B 19/408 (2006.01)

(52) U.S. Cl.
CPC ............ *G05B 19/409* (2013.01); *G05B 19/408* (2013.01)
USPC ............................... 700/180; 700/159; 700/17

(58) Field of Classification Search
USPC ............................................ 700/180, 159, 17
See application file for complete search history.

(56) References Cited

U.S. PATENT DOCUMENTS

| | | | | |
|---|---|---|---|---|
| 3,882,304 A | * | 5/1975 | Walters | 700/163 |
| 4,138,718 A | * | 2/1979 | Toke et al. | 700/7 |
| 4,364,110 A | * | 12/1982 | Hyatt | 700/180 |
| 4,370,720 A | * | 1/1983 | Hyatt | 700/194 |
| 4,510,565 A | * | 4/1985 | Dummermuth | 700/7 |
| 4,608,643 A | * | 8/1986 | Breitenstein et al. | 700/164 |
| 4,991,076 A | * | 2/1991 | Zifferer et al. | 700/18 |
| 5,140,839 A | * | 8/1992 | Bruns | 72/405.1 |
| 5,243,511 A | * | 9/1993 | Zifferer et al. | 700/18 |
| 5,266,878 A | * | 11/1993 | Makino et al. | 318/571 |
| 5,287,548 A | * | 2/1994 | Flood et al. | 700/18 |
| 5,291,391 A | * | 3/1994 | Mead et al. | 700/28 |
| 5,349,518 A | * | 9/1994 | Zifferer et al. | 700/87 |

(Continued)

FOREIGN PATENT DOCUMENTS

| | | | | |
|---|---|---|---|---|
| EP | 553621 A1 | * | 8/1993 | G05B 19/403 |
| JP | 02056607 A | * | 2/1990 | G05B 19/18 |

(Continued)

OTHER PUBLICATIONS

Xiaohui, L., Su, W., Caiyun, X., Xiaobo, Z., and Xiaohui, L., "Study on the Control System of the Lathing and Welding Compond Machine Tool", 2007, LNCIS 362, pp. 375-382.*

(Continued)

*Primary Examiner* — Mohammad Ali
*Assistant Examiner* — Kelvin Booker
(74) *Attorney, Agent, or Firm* — Whyte Hirschboeck Dudek S.C.

(57) ABSTRACT

A method of controlling a machine tool and other controlled devices, as well as a programmable numerical control (PNC) system, are disclosed. In at least one embodiment, the method of controlling includes receiving a first part program at a programmable logic controller (PLC), and storing the first part program in a string array library of a memory portion of the PLC. The method further includes communicating information between the PLC and an operator interface regarding the first part program, and providing a first signal from the PLC to a first port so as to cause the first machine tool to be operated in accordance with the first part program. Also, in at least some embodiments, the PNC system allows for control of multiple machine tools and/or other controlled devices, by way of one or more part programs, and/or for editing of a part program while that program is being executed.

17 Claims, 11 Drawing Sheets

(56) References Cited

U.S. PATENT DOCUMENTS

| | | | |
|---|---|---|---|
| 5,363,026 A * | 11/1994 | Currat | 318/569 |
| 5,404,288 A * | 4/1995 | McDunn | 700/21 |
| 5,453,933 A * | 9/1995 | Wright et al. | 700/181 |
| 5,471,561 A * | 11/1995 | Cowgill et al. | 700/247 |
| 5,727,170 A * | 3/1998 | Mitchell et al. | 710/105 |
| 5,758,123 A * | 5/1998 | Sano et al. | 703/22 |
| 5,765,000 A * | 6/1998 | Mitchell et al. | 710/266 |
| 5,933,638 A * | 8/1999 | Cencik | 717/131 |
| 5,991,528 A * | 11/1999 | Taylor et al. | 700/95 |
| 5,991,533 A * | 11/1999 | Sano et al. | 703/28 |
| 6,101,425 A * | 8/2000 | Govindaraj et al. | 700/181 |
| 6,112,133 A * | 8/2000 | Fishman | 700/182 |
| 6,144,895 A * | 11/2000 | Govindaraj et al. | 700/181 |
| 6,157,864 A * | 12/2000 | Schwenke et al. | 700/79 |
| 6,167,319 A * | 12/2000 | Harris et al. | 700/86 |
| 6,167,406 A * | 12/2000 | Hoskins et al. | 705/1.1 |
| 6,198,480 B1* | 3/2001 | Cotugno et al. | 715/866 |
| 6,219,586 B1* | 4/2001 | Sakai | 700/182 |
| 6,243,611 B1* | 6/2001 | Hazama et al. | 700/97 |
| 6,247,168 B1* | 6/2001 | Green | 700/17 |
| 6,268,853 B1* | 7/2001 | Hoskins et al. | 700/83 |
| 6,308,108 B1* | 10/2001 | Michiwaki et al. | 700/195 |
| 6,317,646 B1* | 11/2001 | de Caussin et al. | 700/173 |
| 6,463,352 B1* | 10/2002 | Tadokoro et al. | 700/169 |
| 6,480,896 B1* | 11/2002 | Brown et al. | 700/56 |
| 6,505,341 B1* | 1/2003 | Harris et al. | 717/100 |
| 6,516,236 B1* | 2/2003 | Brown et al. | 700/56 |
| 6,528,762 B2* | 3/2003 | Mayer | 219/121.83 |
| 6,542,925 B2* | 4/2003 | Brown et al. | 700/83 |
| 6,556,950 B1* | 4/2003 | Schwenke et al. | 700/83 |
| 6,584,373 B1* | 6/2003 | Guenther et al. | 700/160 |
| 6,608,282 B2* | 8/2003 | Tomlinson et al. | 219/121.82 |
| 6,618,856 B2* | 9/2003 | Coburn et al. | 700/86 |
| 6,720,949 B1* | 4/2004 | Pryor et al. | 345/158 |
| 6,772,040 B1* | 8/2004 | Picard et al. | 700/166 |
| 6,819,974 B1* | 11/2004 | Coleman et al. | 700/195 |
| 6,862,492 B2* | 3/2005 | Sagasaki et al. | 700/159 |
| 6,862,553 B2* | 3/2005 | Schwenke et al. | 700/83 |
| 6,941,543 B1* | 9/2005 | Brown et al. | 700/28 |
| 6,975,913 B2* | 12/2005 | Kreidler et al. | 700/96 |
| 6,993,456 B2* | 1/2006 | Brooks et al. | 700/83 |
| 7,003,373 B2* | 2/2006 | Baumann et al. | 700/189 |
| 7,010,368 B2* | 3/2006 | Otani et al. | 700/86 |
| 7,069,185 B1* | 6/2006 | Wilson et al. | 700/26 |
| 7,137,107 B1* | 11/2006 | Brown | 700/184 |
| 7,139,843 B1* | 11/2006 | Brown et al. | 700/87 |
| 7,155,303 B2* | 12/2006 | Sagasaki et al. | 700/86 |
| 7,206,657 B2* | 4/2007 | Esterling | 700/175 |
| 7,266,476 B2* | 9/2007 | Coburn et al. | 700/86 |
| 7,272,458 B2* | 9/2007 | Tomita | 700/87 |
| 7,308,327 B2* | 12/2007 | Coburn et al. | 700/97 |
| 7,379,777 B2* | 5/2008 | Chandhoke | 700/40 |
| 7,501,779 B2* | 3/2009 | Seong et al. | 700/190 |
| 7,536,237 B2* | 5/2009 | Esterling | 700/175 |
| 7,546,232 B2* | 6/2009 | Brooks et al. | 700/83 |
| 7,548,795 B2* | 6/2009 | Sagasaki et al. | 700/181 |
| 7,561,927 B2* | 7/2009 | Oyama et al. | 700/169 |
| 7,684,890 B2* | 3/2010 | Grossmann et al. | 700/169 |
| 7,684,891 B2* | 3/2010 | Okrongli et al. | 700/179 |
| 7,756,801 B2* | 7/2010 | Reich et al. | 700/100 |
| 7,949,422 B1* | 5/2011 | Little et al. | 700/180 |
| 8,090,557 B2* | 1/2012 | Koch et al. | 703/1 |
| 8,155,769 B2* | 4/2012 | Chandhoke | 700/86 |
| 2002/0091460 A1* | 7/2002 | Allen | 700/173 |
| 2002/0151420 A1* | 10/2002 | Scott et al. | 483/29 |
| 2003/0050725 A1* | 3/2003 | Dirnfeldner | 700/174 |
| 2003/0144753 A1* | 7/2003 | Otani et al. | 700/87 |
| 2003/0192865 A1* | 10/2003 | Cole et al. | 700/166 |
| 2003/0204283 A1* | 10/2003 | Picard et al. | 700/166 |
| 2003/0204560 A1* | 10/2003 | Chen et al. | 709/203 |
| 2005/0071802 A1* | 3/2005 | Brakelmann et al. | 700/87 |
| 2005/0154488 A1* | 7/2005 | Esterling | 700/175 |
| 2005/0166190 A1* | 7/2005 | Hoefler et al. | 717/136 |
| 2006/0036798 A1* | 2/2006 | Dickey et al. | 711/100 |
| 2006/0212161 A1* | 9/2006 | Bhat et al. | 700/197 |
| 2007/0016325 A1* | 1/2007 | Esterling | 700/175 |
| 2007/0061037 A1* | 3/2007 | Grossmann et al. | 700/182 |
| 2007/0070038 A1* | 3/2007 | Hoffberg et al. | 345/156 |
| 2008/0058982 A1* | 3/2008 | Gray | 700/159 |
| 2008/0058984 A1* | 3/2008 | Gray et al. | 700/192 |
| 2008/0059974 A1* | 3/2008 | Hasegawa | 719/313 |
| 2008/0091931 A1* | 4/2008 | McNutt et al. | 713/1 |
| 2008/0133789 A1* | 6/2008 | McNutt et al. | 710/30 |
| 2009/0192857 A1* | 7/2009 | Morse et al. | 705/8 |
| 2009/0208223 A1* | 8/2009 | Chen et al. | 398/141 |
| 2009/0240368 A1* | 9/2009 | Young et al. | 700/166 |
| 2009/0319394 A1* | 12/2009 | Kreidler et al. | 705/26 |
| 2010/0011466 A1* | 1/2010 | da Costa e Silva et al. | 800/278 |
| 2010/0138018 A1* | 6/2010 | Bretschneider et al. | 700/97 |

FOREIGN PATENT DOCUMENTS

| | | | | | |
|---|---|---|---|---|---|
| JP | 2002268712 A | * | 9/2002 | | G05B 19/05 |
| JP | 2002300226 A | * | 10/2002 | | H04L 29/06 |
| JP | 2004310592 A | * | 11/2004 | | G05B 19/048 |
| JP | 2006040121 A | * | 2/2006 | | |
| JP | 2007280376 A | * | 10/2007 | | |
| JP | 2009009505 A | * | 1/2009 | | |

OTHER PUBLICATIONS

Proctor, F.M., Damazo, B., Yang, C. and Frechette, S., "Open Architectures for Machine Control", Dec. 1993, NISTIR 5307, National Institutes of Standards and Technology.*

Kennedy, B., CNC Makers Enhance and Adapt Their Technologies to Serve a Range of Shop Needs, May 2007, Custom Control, vol. 59, No. 5.*

Hust Automation, "HUST H2N CNC Connecting Manual", Feb. 2006, HUST Automation Inc., No. 80 Industry Rd, Toufen Miaoli, Taiwan, R.O.C.*

Acroloop Motion Control System, "AcroMill/AcroCut 1-8 Axis General Purpose Control Software", Mar. 23, 1998, Acroloop Motion Control Systems, Inc., 3650 Chestnut Street North, Chaska, MN 55318.*

Que Corporation, Que's Computer User's Dictionary, 1990, Que Corporation, 11711 North College Avenue, Carmel, IN 46032, ISBN 0-88022-540-8, p. 31, 265, 377-379 and 434.*

Rosenberg, J.M., Dictionary of Computers, Information Processing and Telecommunications, Second Edition, 1987, John Wiley and Sons, Inc., ISBN 0-471-85558-8, p. 27, 331-332 and 608.*

United Electric Industries, "Programmable Automation Controller [Definition and Description]", retrieved from the Internet on Mar. 21, 2012 at www.ueidaq.com/programmable-automation-controllers.html.*

Opto 22, "Manufacturing Intelligence Software Portal", Mar. 2007, Retrieved from the Internet on Nov. 1, 2012 at "www.automation.com/smc".*

Opto 22, "Considerations for Choosing a Programmable Automation Controller (PAC)", 2007, White Paper Form 1733-080206, Retrieved from the Internet on Oct. 18, 2012 at "www.opto22.com".*

Opto 22, "Software for Programmable Automation Controller (PACs)", 2007, White Paper Form 1736-080206, Retrieved from the Internet on Oct. 18, 2012 at "www.opto22.com".*

Opto 22, "Upgrading Motion Control System on Production Testing and Validation Machinery", 2007, Case Study Form 1750-080108, Retrieved from the Internet on Oct. 18, 2012 at "www.opto22.com".*

Opto 22, "Understanding Programmable Automation Controller (PACs) in Industrial Automation", May 2008, White Paper Form 1634-080519, Retrieved from the Internet on Oct. 18, 2012 at "www.opto22.com".*

Comprehensive Machine Retrofit Solutions; Rockwell Automation; www.rockwellautomation.com/solutions; Feb. 2004; 4 pages.

* cited by examiner

WORK COORDINATES OFFSETS

| | X | Z | W |
|---|---|---|---|
| CONFIG. LIMITS | | CONFIG. LIMITS | CONFIG. LIMITS |
| + X PLUS (52) | CURRENT OFFSET: 585.913 (54) | + Z PLUS | CURRENT OFFSET: 5.860 |
| | | | + W PLUS |
| X WORK OFFSET (51) | NEW OFFSET: 585.913 | Z WORK OFFSET | CURRENT OFFSET: 2.460 |
| | OFFSET CHANGE: 0.000 | | NEW OFFSET: 2.460 |
| | | | W WORK OFFSET |
| | | | NEW OFFSET: 5.860 |
| | | | OFFSET CHANGE: 0.000 |
| − X MINUS (53) | HIGH LIMIT: 700.000 LOW LIMIT: −600.000 | − Z MINUS | HIGH LIMIT: 100.000 LOW LIMIT: −100.000 |
| | | | − W MINUS |
| | | | HIGH LIMIT: 100.000 LOW LIMIT: −100.000 |

(55) (56) OPERATOR PROMPT BAR

| | | | | | | PREVIOUS SCREEN |
|---|---|---|---|---|---|---|
| | WEAR OFFSETS | RH OFFSETS | WORK OFFSETS | RH WORK OFFSETS | | |
| OFFSETS | MACHINE OPERATIONS | PRODUCTION DATA | PARAMETERS | ALARMS | PASSWORDS | HELP |
| MACHINE STATUS | | | | | | |

FIG. 8

METHOD OF CONTROLLING A MACHINE TOOL

CROSS-REFERENCE TO RELATED APPLICATIONS

--

STATEMENT REGARDING FEDERALLY SPONSORED RESEARCH OR DEVELOPMENT

--

FIELD OF THE INVENTION

The present invention relates to controlled systems employing processor-based control devices, and more particularly relates to such systems that involve machine tools.

BACKGROUND OF THE INVENTION

A machine tool generally refers to a tool that is controlled by servo motors to move in a linear or rotational manner based on several coordinates such as the standard x-axis, y-axis and z-axis coordinates. Various types of machine tools, such as mills, lathes, drills, grinders, welding machines and routers that were once operated by a trained engineer have, in many cases, been replaced by a machine tool that has been coupled to a dedicated computer numerical controller (CNC). A CNC provides specific instructions to the machine tool components enabling them to complete a specific process such as drilling a hole in a piece of metal stock at a particular x-axis, y-axis and z-axis coordinate. This type of CNC controlled machine tool is generally referred to as a CNC machine. CNC machines provide many benefits in industrial applications as they can be used continuously 24 hours a day, 365 days a year and only need to be switched off for occasional maintenance. Additionally, once a CNC machine is programmed to make a particular part, it can then manufacture hundreds or even thousands of the same part and each manufactured product will be exactly the same.

CNCs range in capability from providing simple point-to-point linear control to providing multiple axis control using highly complex algorithms. A CNC machine will typically have an interface for use by an operator that provides a standard set of commands that can be selected by the operator, and that additionally allows the operator to enter modifying data such as work, tool and geometric offsets. When a tool offset is required, for example due to wear on the tool surface, the operator typically enters offset adjustments into the CNC and then visually verifies that the tool is in the correct position by looking at the tool. This process of offsetting the tool is rather cumbersome and often requires multiple attempts to properly align the tool.

A CNC machine typically operates based upon a text-based program file or "part program" (also referred to as a "tool path program" that follows the RS274D standard (also known as ISO 6983). Such a part program typically includes a list of instructions (each instruction line being considered a block) identified as G-codes and M-codes along with various associated parameters in ASCII format. M-codes refer to the standard machine codes that are normally used to represent instructions such as spindle on, tool change, coolant off, etc., whereas a line of G-code can instruct a machine tool to do one of several things such as component movements, drilling, etc.

When a CNC is connected to a particular machine tool, the part program(s) provided (typically pre-installed) on the CNC is further programmed to suit the particular machine tool. This custom programming can be done by way of any of several types of programming languages depending on the type of CNC being used. The programming language(s) serve to translate the part program into machine tool actions. Additionally, a CNC machine will typically have an operator interface such as a touch activated display screen. The interface will have various standard and customizable screens with various command and data entry buttons that can be accessed by touching the screen.

Each CNC is dedicated to operate a single machine tool. If an operator desires to machine a part requiring several operations (processes) by separate machine tools, a series of CNC machines need to be combined, thereby creating a "cell" of multiple CNC machines, each of which has its own respective dedicated CNC. Additionally, if an operator desires to run the same process on multiple machine tools, the operator loads the desired part program into each CNC machine and then starts and operates each CNC machine separately. If the operator desires to make changes to a part program and then execute the program, the CNC machine is first stopped, then the new program file is loaded into memory, and finally the machine is re-started. In the case of multiple machines running the same processes, the part program is loaded into each CNC machine.

BRIEF SUMMARY OF THE INVENTION

In at least some embodiments, the present invention relates to a method of controlling a first machine tool. The method includes receiving a first part program at a programmable logic controller (PLC), and storing the first part program in a string array library of a memory portion of the PLC. The method further includes communicating information between the PLC and an operator interface regarding the first part program, and providing a first signal from the PLC to a first port so as to cause the first machine tool to be operated in accordance with the first part program.

Additionally, in at least some embodiments, the present invention relates to a method of controlling a controlled device. The method includes receiving at least one part program at a programmable logic controller (PLC), storing the at least one part program in a string array library of a memory portion of the PLC, and communicating information to an operator interface regarding the stored at least one part program. Also, the method includes receiving a first selection signal at the operator interface indicating a first selection of a first of the at least one part program and communicating the first selection to the PLC, and copying the selected part program to an active program buffer of the memory portion. Further, the method includes receiving a second selection signal at the operator interface indicating a second selection of a machine tool that is to perform a process in accordance with the selected part program, decoding the selected part program into commands and associated real value axis positions, and storing the commands and associated real value axis positions and generating instructions to execute the commands. Additionally, the method includes communicating the commands and associated real value axis positions at least indirectly to both the operator interface and machine tool, so that the machine tool operates based upon the selected part program and so that a representation of an execution of the selected part program is displayed at the operator interface.

Further, in the present invention in at least some embodiments relates to a programmable numeric control (PNC) system. The system includes an operator interface, and first and second ports respectively capable of at least indirectly interfacing first and second controlled devices, respectively. Also, the system includes a programmable logic controller (PLC) coupled to each of the operator interface and the first and second ports, wherein the PLC further includes a processing portion and a memory portion. The memory portion further includes a part program library capable of storing a plurality of part programs, and an offset library capable of storing offset information associated with the part programs. The PLC is capable of sending control signals via the first and second ports that are suitable for controlling the first and second controlled devices in accordance with at least one of the part programs.

BRIEF DESCRIPTION OF THE DRAWINGS

FIGS. 2-8 depict exemplary operator interface screens of the PNC system of FIG. 1;

DETAILED DESCRIPTION OF THE PREFERRED EMBODIMENT

Figure 1:
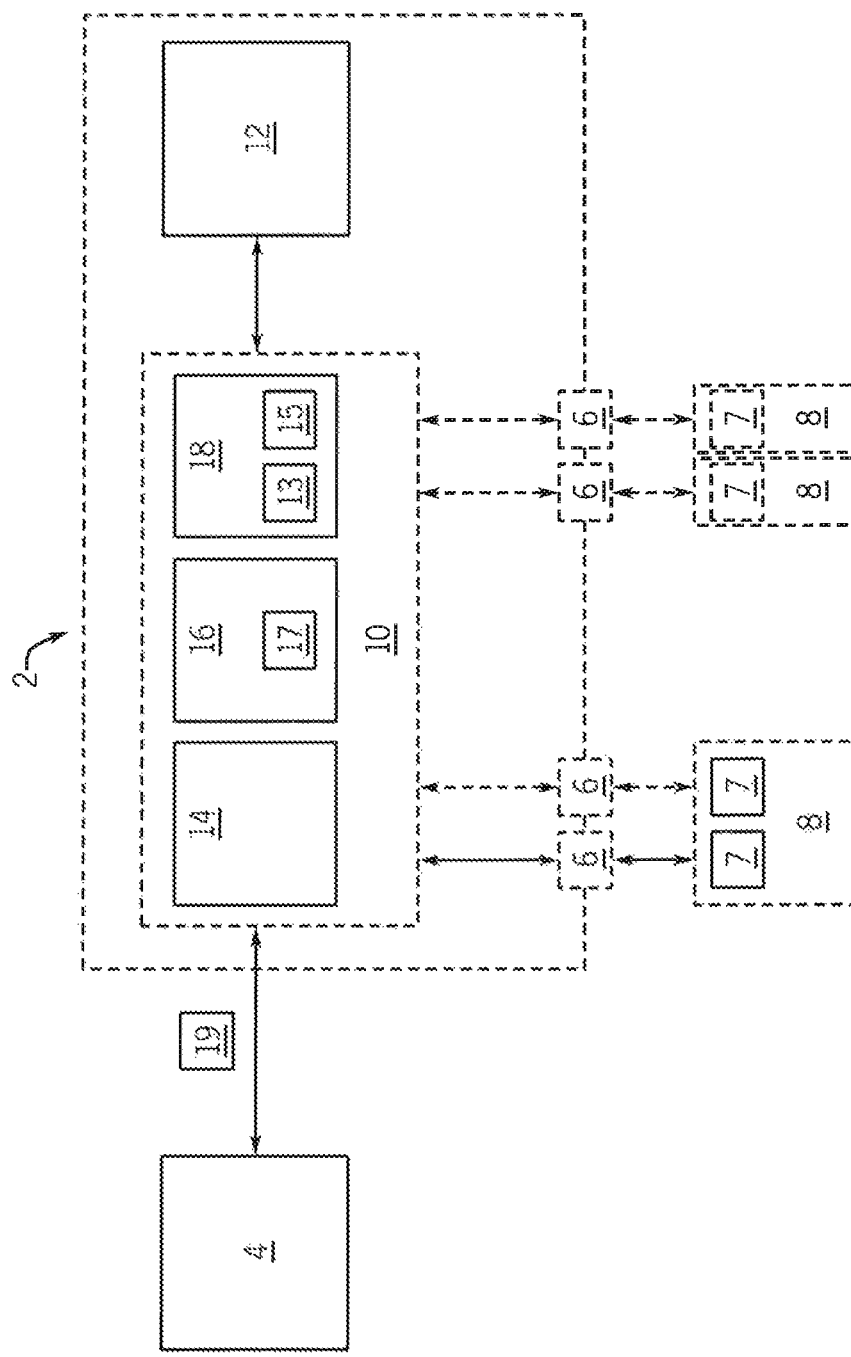
FIG. 1 depicts, in schematic form, an exemplary programmable numerical control (PNC) system operating in combination with a host computer, input/output (I/O) control devices and one or more machine tools.

FIG. 1 shows in schematic form an exemplary programmable numerical control (PNC) system 2 operating in combination with at least one host computer 4, one or more input/output (I/O) control devices 6, and one or more machine tools 8. In the present embodiment, one host computer 4 is shown, while multiple I/O control devices 6 and multiple machine tools 8 are shown, although in other embodiments more than one host computer (or possibly no such host computer) are present and/or only one I/O control device and machine tool are present. Also as shown, in the present embodiment, the PNC system 2 comprises a programmable logic controller (PLC) 10 that is in communication with the I/O control devices 6, as well as an operator interface 12 that also is in communication with the PLC 10. In at least some circumstances, the operator interface 12 and/or I/O control devices 6 can be considered part of the PLC 10.

In the present embodiment, the PLC 10 is intended to additionally encompass any of a variety of types of programmable logic controllers or industrial controllers with similar functionality. For example, the PLC 10 can include a PLC-5 PLC available from Rockwell Automation, Inc., of Milwaukee Wis. Also, for example, the PLC can include any of a variety of Programmable Automation Controllers (PACs) such as a ControlLogix PAC or a CompactLogix PAC, or any of a variety of Safety Programmable Controllers (SPGs) such as a GuardPLC, also available from Rockwell Automation, Inc. In general, PLCs such as the PLC 10 are programmed by systems designers to operate manufacturing processes via user-designed logic programs or user programs. The user programs are typically stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples. Often the PLCs implement special redundancy techniques and/or other techniques intended to enhance reliability of operation.

As shown in FIG. 1, the PLC 10 in particular further comprises a communication portion 14, a processor portion 16 loaded with a ladder logic program 17, and a memory portion 18. Further, the operator interface 12 includes an operator input device that allows an operator to control and enter data into the PNC system 2 and a PLC output device that provides a visual display for an operator to receive feedback and process information, as described in further detail below. Additionally, in the present embodiment, one or more part program(s) 19 are installed (or pre-installed prior to operation) upon the PNC system 2. As shown, the part program(s) in the present embodiment are received by the PNC system 2 from the host computer 4. The host computer 4 is intended to be representative of any type of micro-processor based device that is capable of communicating a part program such as the part program(s) 19 to the PLC 10.

With respect to the I/O control devices 6, several of these are shown in FIG. 1. The I/O control devices 6 can include one or more of a wide variety of devices, such as digital and analog input or output cards, that can provide an interface (e.g., serve as an input or output port), between the processor portion 16 of the PLC 10 and various machine input and output (I/O) devices 7 associated with the machine tools 8. For example one or more of the I/O control device 6 can be an input card such as a "1756-IF16-6" channel analogue input card as manufactured by Rockwell Automation, Inc. Although the I/O control devices 6 can be input and output cards, various other types of I/O control devices can also be used to interface the processor portion 16 with the machine tool 8. Further, the machine I/O devices 7 can include motion input devices such as motion detectors, proximity sensors, position sensors, etc., and/or machine output devices such as relays, servo drives for the positioning of a machine tool component including, for example, a Kinetix or Powerfiex drive as manufactured by Rockwell Automation, Inc., etc.

In the present embodiment, the host computer 4 more particularly communicates the part program(s) 19 to the communication portion 14 of the PLC 10. The communication portion 14 represents an interface of the PLC 10, and can include, for example, a communication port built directly into the PLC, such as a serial port, or a separate piece of communication hardware that is in direct communication with the PLC, such as an Ethernet card situated in the same rack as the PLC. Further, the part program(s) 19 can be transferred between the host computer 4 and the communication portion 14 using various media and methods of communication, for example, an Ethernet connection, a RS232 serial port connection, the Internet (using for example hyperlinks), and/or wireless communication links.

In the present embodiment, the part program(s) 19 can be created upon (or received from another location by) the host computer 4 by way of a spreadsheet program such as Excel as manufactured by Microsoft Corporation of Redmond, Wash. The host computer 4 then transfers the part program(s) to a part program library string array in the memory portion 18. Additionally, the PNC system 2 includes Excel macros, where the macros utilize either a Dynamic Data Exchange (DDE) or Object Linking and Embedding (OLE) for Process Control (OPC) communications protocol to support the data exchange. Upon being provided from the host computer 4 to the PNC system 2 and particularly the PLC 10, drivers associated with the processing portion 16 of the PLC transfer the part program information to the memory portion 18. As discussed further below, the ladder logic 17 of the processing portion 16 of the PLC 10 then is able to utilize the part program information stored in the memory potion 18 for the purpose of executing/running a part program or potentially for other purposes. In at least one embodiment, the PLC 10 can use ladder logic in accordance with a ladder-logic-based PLC programming language such as RSLogix developed by Rockwell Automation, Inc.

As mentioned above, in the present embodiment the PLC 10 also is in communication with an operator interface 12 (or, in some embodiments, more than one operator interface) of the PNC system 2. The operator interface 12 can be used to send a variety of commands to the PLC 10 and receive a variety of data from the PLC 10. The operator interface 12 can be formed as part of a single unit including both that interface and the PLC 10 (e.g., in the same housing), or the two devices can be distinct devices that are in communication with one another. Communication between the PLC 10 and the operator interface 12 can be accomplished by various methods, such as a direct wired serial connection, or a local or remote Ethernet connection allowing for the operator interface and PLC to be located in different portions of a manufacturing facility or even in different facilities.

In one embodiment, the operator interface 12 includes a touch-activated display screen, such as a PanelView Plus human-machine interface (HMI), as manufactured by Rockwell Automation, Inc. Alternatively, in other embodiments various other types of devices can be used as the operator interface 12 and, in some embodiments, even another computer such as the host computer 4 along with an operator input device such as a mouse, keyboard or joystick, can serve as the operator interface 12. The operator interface 12 can be programmed to display any of a variety of preconfigured and/or customizable screens that can provide various types of data and control commands.

In the present embodiment, the part program(s) 19 imported into the PLC 10 via the PLC communications portion 14 are stored in the memory portion 18 and, more particularly, in a part program library 13 that takes the form of a PLC string array. Where multiple part program(s) 19 (each of which can have a different number of blocks) are imported into the PLC 10, the PLC 10 can segregate each of the part programs from the other part programs by assigning each respective part program to a respective location in the part program library 13. Once loaded into the memory portion 18 in this manner, the part programs 19 can be selected for multiple purposes, and particularly for the purpose of running a process on a given one of the machine tools 8 and for the purpose of being edited. Additionally as shown in FIG. 1, the memory portion 18 also includes an offset library 15 that is a real number array. As will be discussed further below, various offsets associated with different ones of the tools 8 and different ones of the part programs 19 can be stored in the offset library 15. Different portions of the offset information can be assigned to different locations in the offset library 15.

While only one part program library 13 and one offset library 15 are shown in FIG. 1, it should be understood that each of those libraries can in at least some embodiments be considered as having multiple locations, subportions, and/or sublibraries. Alternatively, more than one part program library and/or more than one offset library can be present in various embodiments of the PNC system. Further, when multiple portions of offset information are present in the offset library 15, and/or when multiple part programs (or portions of part programs) are present in the part program library 13, the memory portion 18 can create and maintain ties (e.g., even a matrix of ties) among different portions of the offset information and different ones of the part programs.

In the present embodiment, the operator interface 12 in combination with the PLC 10 and the memory portion 18 in particular provide an operator with the option of running multiple machine tools 8 simultaneously using a single part program (as discussed further with respect to FIG. 4 below), as well as the options of running a single machine tool (or multiple parts thereof) 8 and/or running multiple machine tools using multiple part programs. For example, in the exemplary embodiment shown in FIG. 1, three different machine tools 8 are shown to be controlled by way of the single PNC system 2, with four of the I/O control devices 6 in particular interfacing with four corresponding machine I/O devices 7 of the three machine tools (as shown, two of the machine I/O devices are associated with different parts of a single one of the machine tools, and the remaining machine I/O devices are respectively associated with different respective machine tools). Thus, in this exemplary embodiment, different part programs can be run (and possibly run simultaneously) in connection with the different machine tools and/or even in connection with the different parts of the machine tools (e.g., as associated with the different respective machine I/O devices 7) or, alternatively, the same part program can be run in relation to multiple ones of the tools (and/or multiple parts of the same or different tools). Thus, the PNC system 2 is particularly versatile, since it allows for a single operator to operate multiple machine tools 8 and associated processes simultaneously from a single operator interface 12. This can be achieved without using multiple dedicated controllers that are respectively employed to control respectively the multiple different machine tools or processes.

Additionally, the operator interface 12 can be used to select any of several different run modes for each of the machine tools 8. Among these are, for example, a Continuous Mode, a Pendant Mode, a Dry Run Mode and a Test Mode. In the Continuous Mode, the PLC 10 operates (e.g., by way of one of the I/O control devices 6 communicating with an appropriate machine I/O device 7) a given one of the machine tools 8 in a normal automatic manner. As for the Dry Run Mode, when operating in this mode, the PLC 10 runs a given one of the part program(s) 19 with the M-codes inactive. Further, with respect to the Test Mode, when operating in this mode, the PLC 10 runs a given one of the part program(s) 19 in relation to a given one (or more) of the machine tools 8, but does so with the motors of the machine tool 8 disabled so as to ensure that tool interference does not occur.

When in the Pendant Mode, the PLC 10 by way of the operator interface 12 allows an operator to control the performance of the steps of a part program 19 by a machine tool in a controlled, block-by-block (step-by-step), manner. In at least some embodiments in which the Pendant Mode is available, the operator interface 12 includes a hand-wheel situated thereon (or that is otherwise in communication with the remainder of the operator interface). By moving the hand-wheel, the operator is able to control the performance of the different blocks on an individualized, discrete basis. Also, in one embodiment, the hand-wheel can instead be considered as constituting one of the machine I/O devices 7 that is tied to a block advance register in the internal logic of the PLC 10 so that, when rotated, the loaded part program is advanced block-by-block, thereby controlling the speed of the process.

Referring to FIGS. 2-8, in the present embodiment, the operator interface 12 is configured to display several different screens. Among these are a Directory Tree screen 20 (see FIG. 2), which provides an overview of all of the available screens and allows an operator to select among and cause the display of a first level of various screens. Also, the operator interface 12 further is capable of providing a Program Manager screen 30 (see FIG. 3), which allows the operator to import and manage part programs such as the part programs 19, and a Machine Status screen 40 (see FIG. 4), which shows the current status of one or more machine tools such as the machine tools 8. Additionally, the operator interface 12 is capable of providing a Work Offset screen 50 (see FIG. 5), which allows an operator to view and modify work offsets for various parameters such as x-axis and y-axis coordinates, and a Tool Offset screen 60 (see FIG. 6), which dynamically displays a given machine tool (e.g., one of the machine tools 8) in relation to a workpiece according to a specific amount of tool offset entered by an operator. Also provided are an exemplary Program Edit screen 70 (see FIG. 7) and an Additional Machine Status screen (see FIG. 8) that shows the statuses of multiple portions of a given tool that are performing different part programs (multiple processes).

Figure 2:
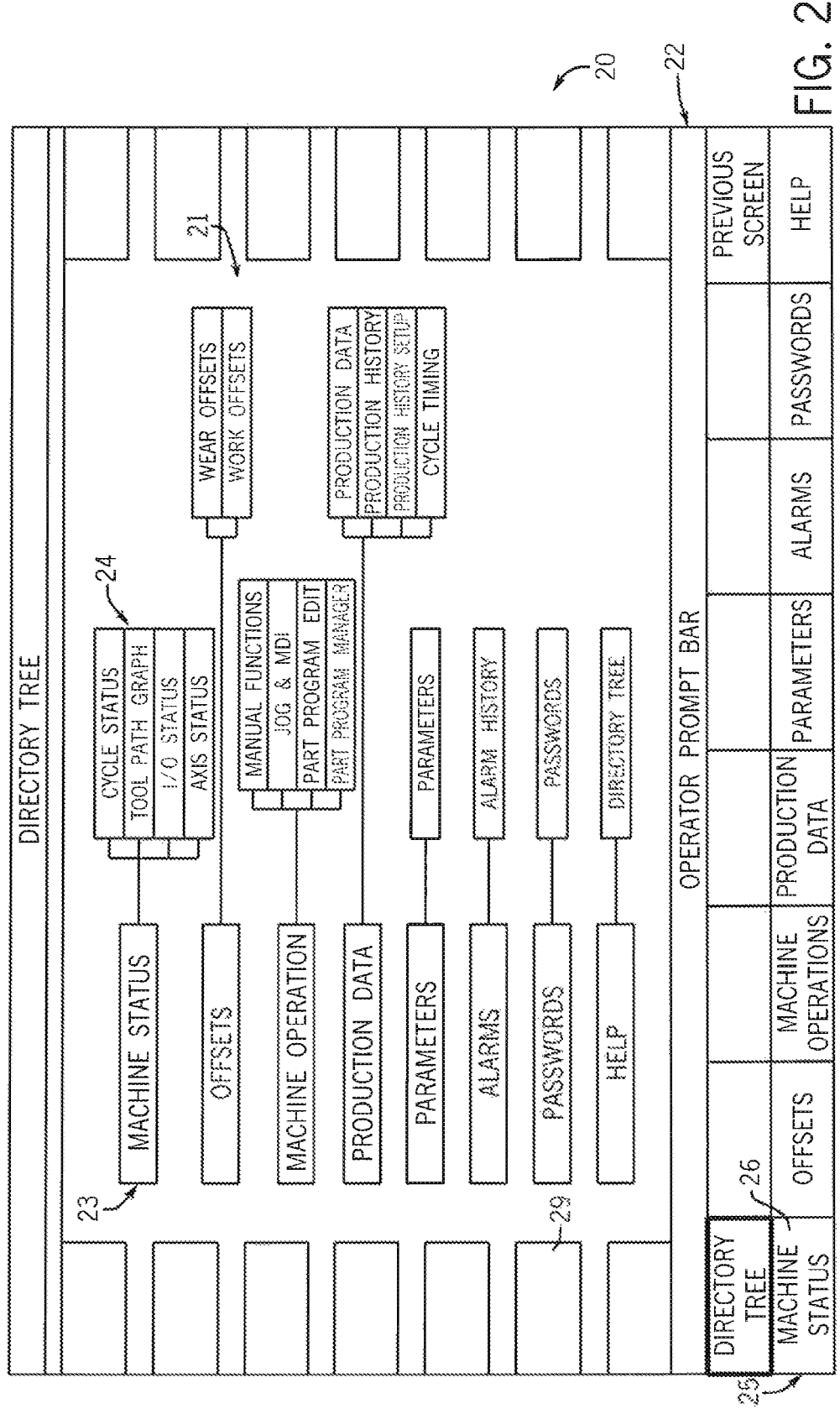

Referring to FIG. 2, the Directory Tree screen 20 includes a display portion 21, an operator prompt portion 22, and screen buttons 25. The display portion 21 shows various first level screens 23 that are available along with their respective second level screens 24. The operator prompt portion 22 is discussed below. The screen buttons 25 are linked to and display the names of the available first level screens 23, such as Machine Status and Offsets. When a specific screen button 25, such as the Machine Status button 26, is selected by an operator, the present screen is replaced by the selected screen, e.g., the Machine Status screen. Additionally, when a new first level screen 23 is selected, the screen buttons 25 can change to or otherwise be assigned to display the names of other screens, such as the second level screens 24 that are linked to the currently displayed first level screen 23. Further, the Directory Tree screen 20 provides buttons to access other functions such as a help menu. Also, various blank buttons 29 are provided that can be programmed to perform specific individual functions or a macro of functions.

Figure 3:
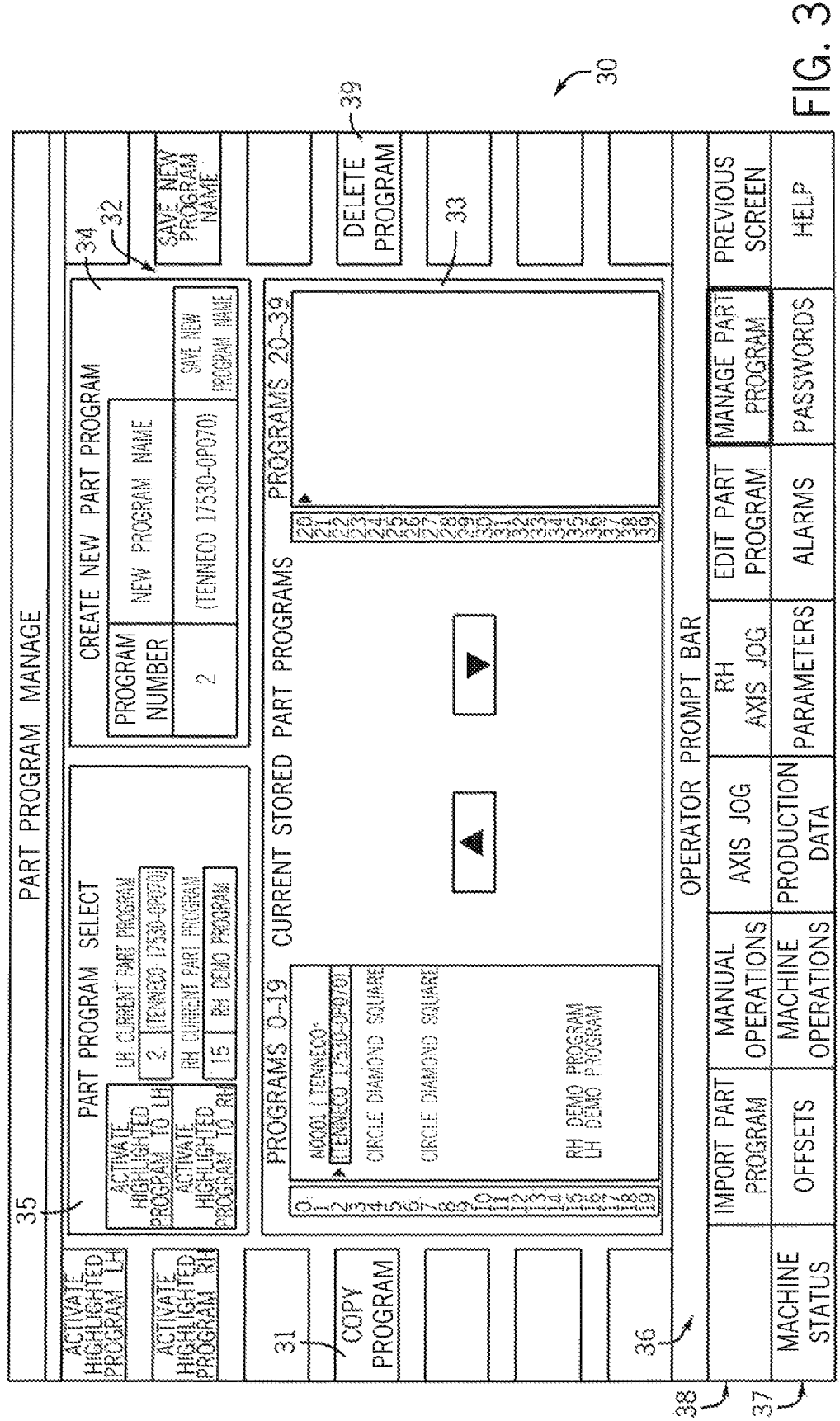

Referring to FIG. 3, the Part Program Manager screen 30 includes a display portion 32 that can comprise various sub-screens (or windows or regions) to select one or more specific program management options. For example, a store sub-screen 33 allows an operator to view and select one or more currently stored part programs, a create sub-screen 34 allows the operator to create a new part program, and a select sub-screen 35 allows an operator to select one or more machine tool(s) 8 or machine tool portion(s) the selected program is assigned to run on. In the present example shown in FIG. 3, a part program entitled "(TENNECO 17530-OP070)" has been selected for operation in connection with a LH (left hand) portion of the current tool.

As should be evident from the select subscreen 35 of FIG. 3, multiple part programs can be selected for different tools or for different portions of the same tool. Thus, as shown, while the aforementioned part program has been selected for operation in connection with the LH portion of the current tool, a different part program entitled "RH DEMO PROGRAM" has been selected for operation in connection with a RH (right hand) portion of the current tool. Also for example (while not specifically shown in FIG. 3), a part program A can be selected to operate on machine tools #1 and #2 simultaneously, a part program B can be selected to operate machine tools #3 and #4 sequentially, and part programs C and D can be selected to operate on machine tool #5 in sequential order.

Further, as shown in one embodiment, the Part Program Manager screen 30 includes an operator prompt portion 36 that displays a field of one or more lines of text. These lines are used to display status messages for the machine tool 8. Status messages are stored in an indexed text array in the memory portion 18 of the PLC 10. In one embodiment, the message text array can contain about 200 messages, although in other embodiments the number of messages can vary substantially based on the specific machine tool application. The ladder logic 17 sets an index number to display one or more of the status messages. In one example, if the operator attempts to start the machine tool 8 and the ladder logic 17 detects that the machine tool 8 cannot be started without further action, the ladder logic 17 would provide the appropriate indexed status message and display it in the operator prompt portion 36. Examples of status messages that can be displayed include, "X AXIS NOT HOMED" or "NOT IN AUTOMATIC MODE." When the ladder logic 17 detects that no conditions currently exist that would prompt a status message, the operator prompt portion 36 will display a default status message, such as "Operator Prompt Bar." Additionally, a row of first level screen buttons 37 and second level screen buttons 38 can be provided in the Part Program Manager screen 30, as well as several buttons such as a copy program button 31 and a delete program button 39 provide access to additional functions.

Figure 4:
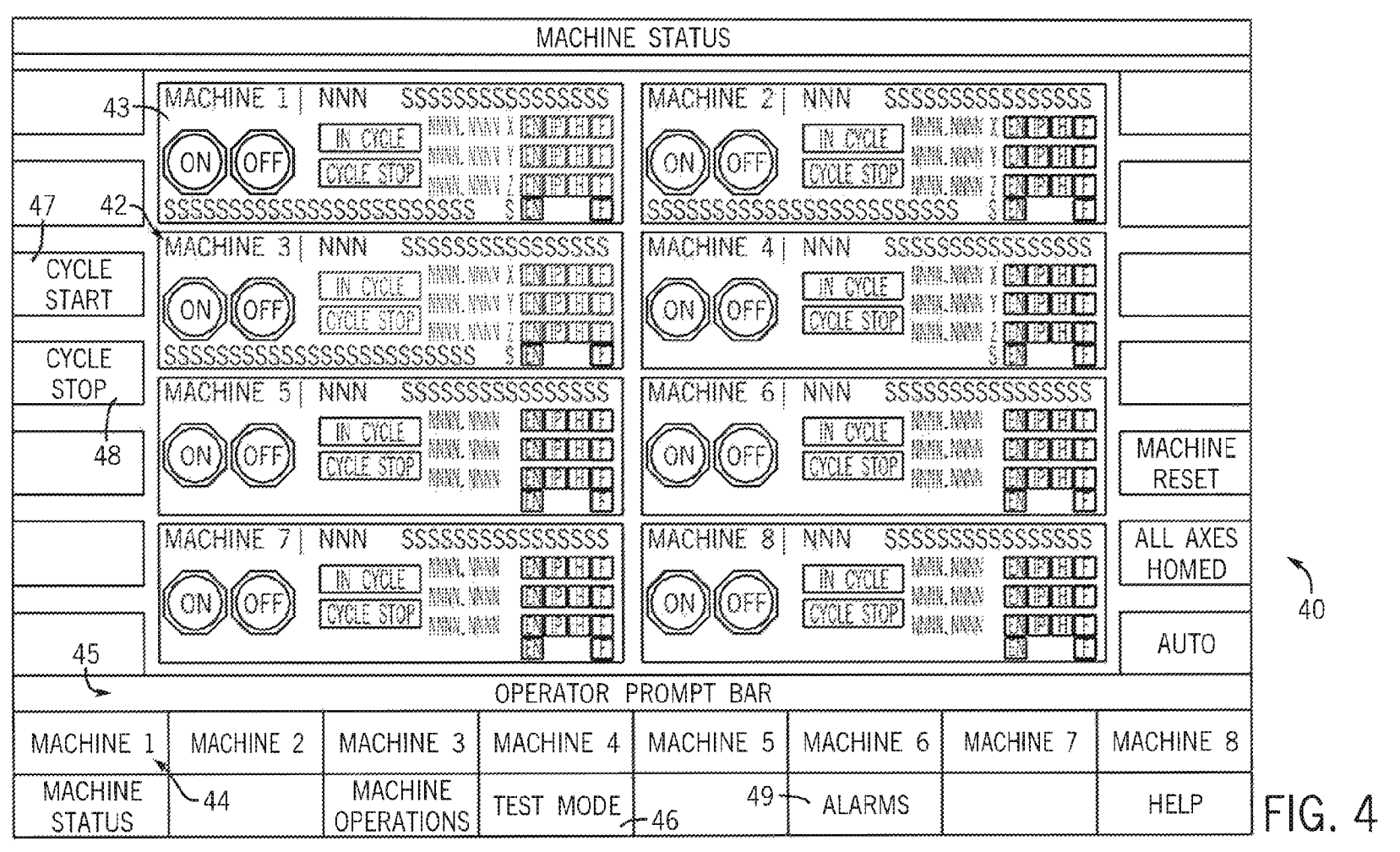

Referring to FIG. 4, an exemplary Machine Status screen 40 is shown that allows for an operator to monitor the statuses of multiple tools (or portions of tools) such as, in this example, machines #1-8. Such a screen can be customized or otherwise be programmable so as to provide the operator access and control to a particular part program that is run on a particular machine tool 8. A display portion 42 is configured to display control sub-screens 43 for each machine tool 8 that has a part program currently loaded to run. Each control sub-screen 43 provides an operator the ability to start and stop the identified machine tool 8 and to change or monitor machine tool offsets and other parameters. Additionally, the Machine Status screen 40 includes individual machine buttons 44 that allows the operator to change the Machine Status screen 40 to a specific Machine Tool screen (not shown) that provides more information and controls for that selected machine tool 8. An operator prompt portion 45 can also be included that operates as discussed above.

Although FIG. 4 depicts the control of machine tools #1-8, multiple programs of varying length can be run on a multitude of machine tools 8 with each machine tool 8 being displayed in a separate control sub-screen 43. The Machine Status screen 40 also includes a test button 46 that activates test mode, thereby allowing the operator to test a part program as previously discussed. A cycle start button 47 and cycle stop button 48 are provided to control the running of a process. Additionally, an alarms button 49 is provided to access an Alarm screen (not shown).

FIG. 5 displays a Work Coordinates Offsets screen 50. The Work Coordinates Offsets screen 50 is displayed subsequent to an operator selecting the Offsets screen button, as previously discussed in regard to FIG. 2. The Work Coordinates Offsets screen 50, includes axis offset selection buttons 51 and axis offset addition and subtraction buttons 52 and 53, respectively. An axis offset selection button 51 and an addition and subtraction button 52, 53 are provided for each coordinate axis available to a particular machine tool 8, such as an x-axis, z-axis, and w-axis. Additionally, sub-screens 54 are provided to view the offset information for each axis. To increase the x-axis offset, for example, an operator would select the x-axis offset selection button 51 and then repeatedly press the x-axis offset addition button 52 until the desired offset is displayed in the x-axis sub-screen 54. Further, an operator prompt portion 55 can be included as discussed above. Additionally, buttons 56 are included on the Work Coordinates Offsets screen 50 to select one of various offsets to be modified including, for example, wear offsets and RH offsets.

Figure 6:
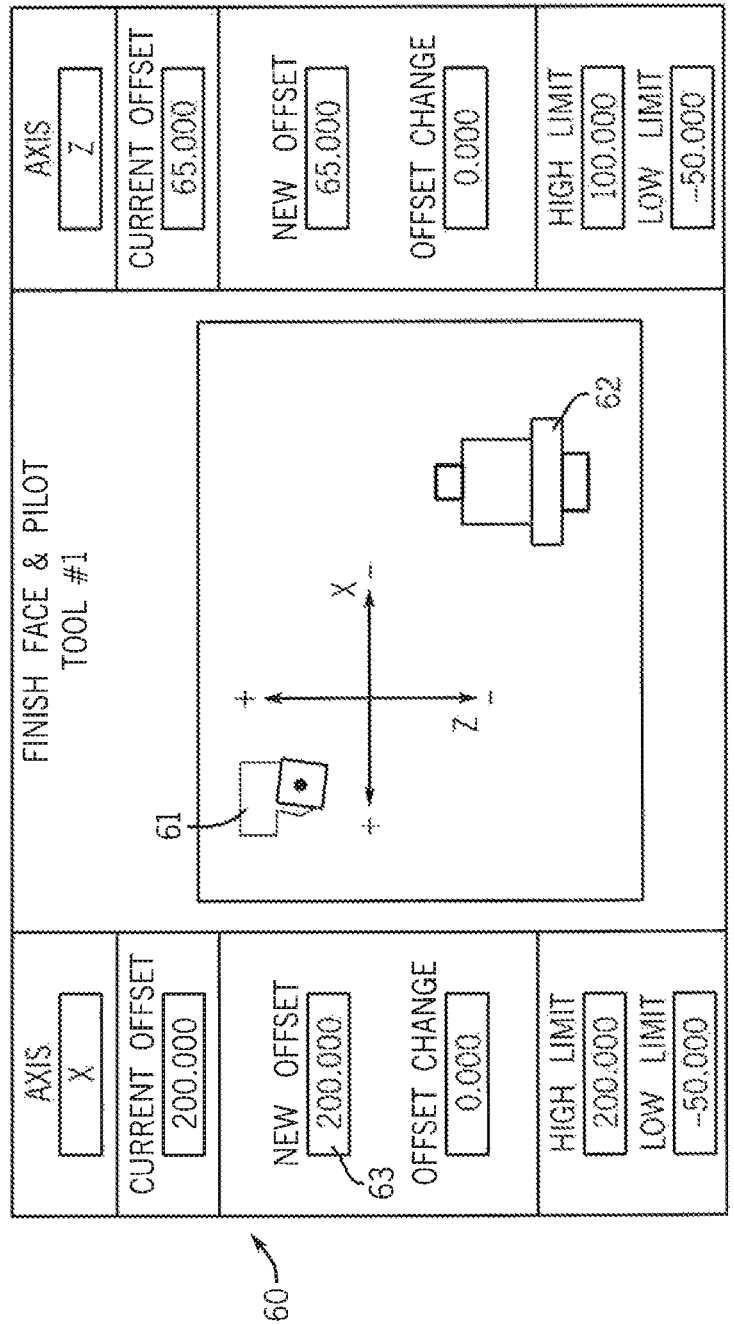

When a portion of a machine tool 8 is replaced, it is common for tool offsets to be required to provide gross alignment. Referring to FIG. 6, the Tool Offset screen 60 provides a graphical interface for setting the axis offsets for a machine tool 8. The Tool Offset screen 60 displays the location of a representative workpiece 61 in relation to a representative tool 62 along a set of axes. Additionally, the Tool Offset screen 60 provides input boxes 63 for each axis to enter a new offset value. The value for each axis offset is correlated to pixels on the Tool Offset screen 60, such that a change in the tool offset in the input box 63 is immediately reflected on the screen, which provides the operator with an efficient process for aligning the machine tool 8 with a workpiece.

Figure 7:
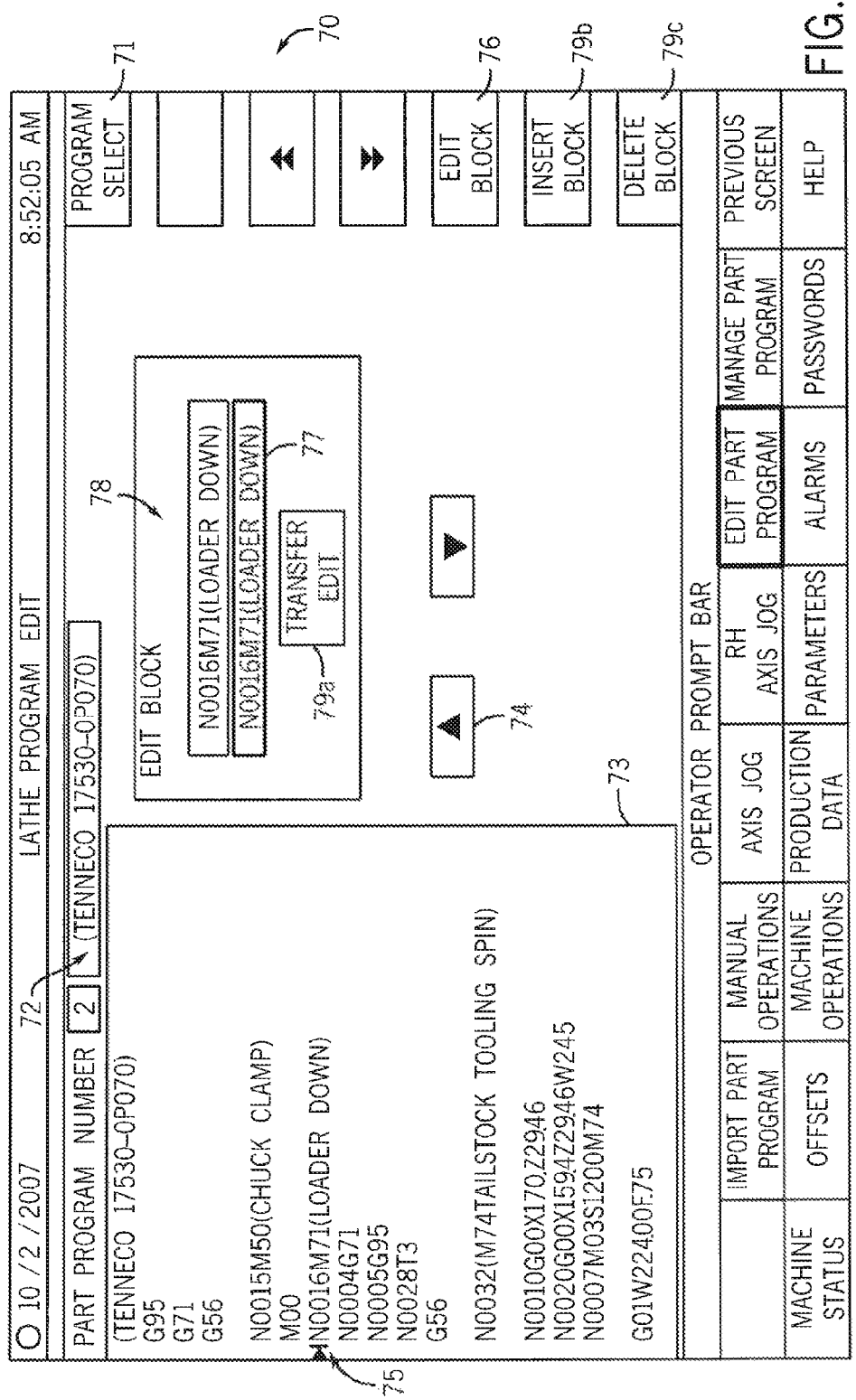

With respect to FIG. 7, an exemplary Program Edit screen 70 is provided that includes a program select button 71 for selecting a part program to edit, and a part program number portion 72 that displays the program name that has been selected for editing. After a part program has been selected, the part program is displayed in a display portion 73. An operator can move a cursor to each block of the part program by pushing toggle buttons 74. The position of the cursor 75 is displayed on the display portion 73. The block of the part program that is marked by the cursor 75 can then be edited by pushing the edit block button 76. The edit block button 76 copies the block into an edit box 77 positioned in an edit block portion 78 of the Program Edit screen 70. The block shown in the edit box 76 can be edited by the operator. To update the edited block in the part program, the operator pushes the transfer edit button 79*a*. Additionally, a block can be added or deleted from the program by selecting the insert block button 79*b* or delete block button 79*c*.

Figure 8:
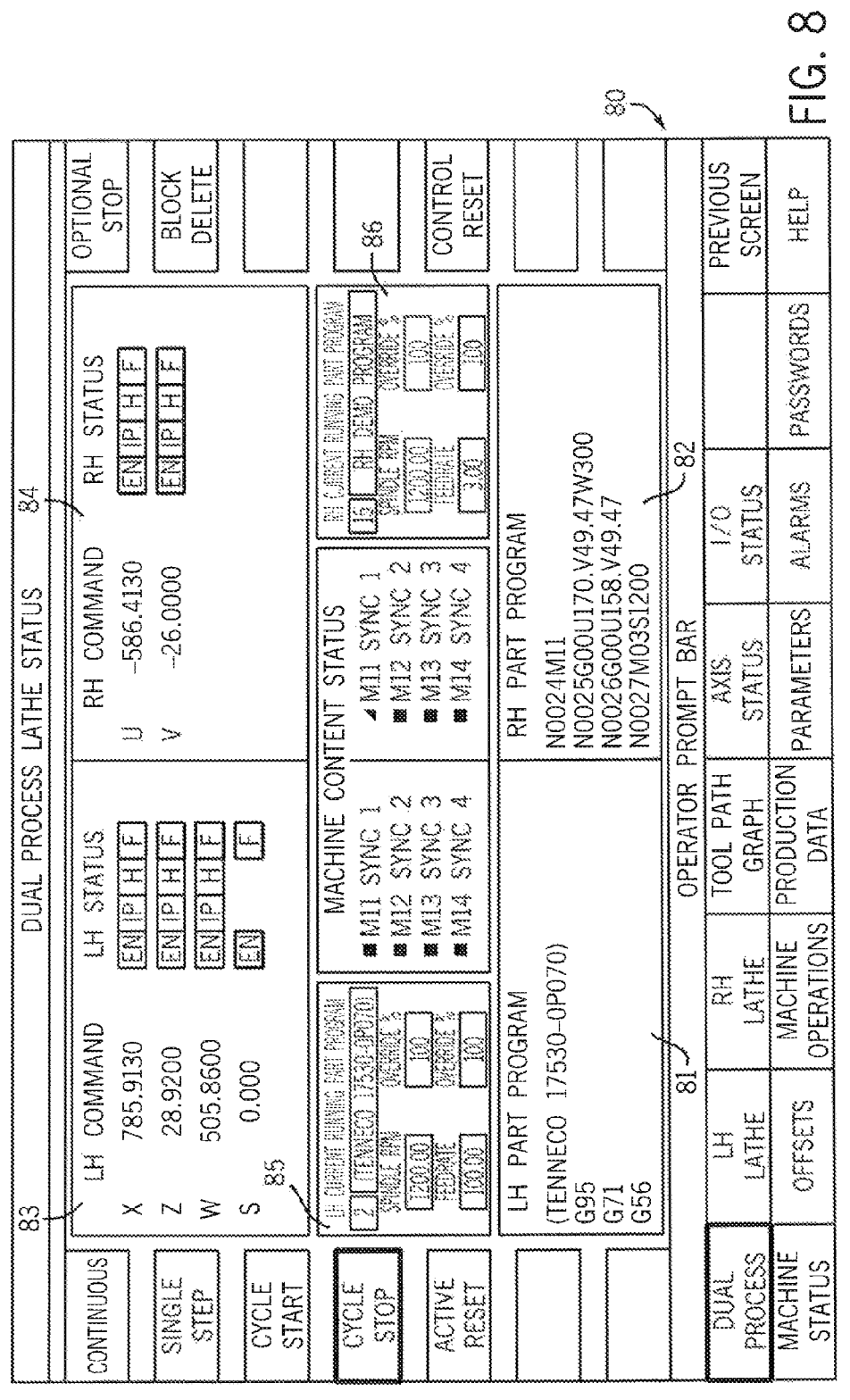

As for FIG. 8, that figure provides the Additional Machine Status screen 80. Although providing similar information as the Machine Status screen 40 of FIG. 4, the screen 80 is intended to illustrate that the operator interface 12 can provide a single screen that includes information about a single process (or multiple processes) that involves running more than one part program on different sections of a single one of the machine tools 8. More particularly, FIG. 8 depicts an exemplary operator interface screen of the PNC system 2 that can provide controls for two part programs running separate processes on a single lathe machine (in this case, the part programs being performed are those that are indicated as being selected in the Part Program Manager screen 30 of FIG. 3). The Additional Machine Status screen 80 further provides screen portions 81 and 82 for displaying the block of the part program 19 that is currently running on the respective portion of the machine. For example, screen portion 82 displays "N0024 M11" at the top, indicating that the current block being run for that particular program is "N0024 M11". The blocks displayed below "N0024 M11" are the subsequent blocks to be run in order. The Additional Machine Status screen 80 also provides display screens 83 and 84 that show the current values for each parameter in each process. Screen portions 85 and 86 provide information for each respective machine tool portions, for example the name of the part programs running on each portion.

Although various screens have been discussed in detail, the PNC system 2 can be configured to include various other informational and control screens. For example, one or more of the following can be included: Tool Path, Cycle Timing, Production Data, Rack Assignment, Axis Graph, Fault History, Manual Operation, etc.

Figure 9:
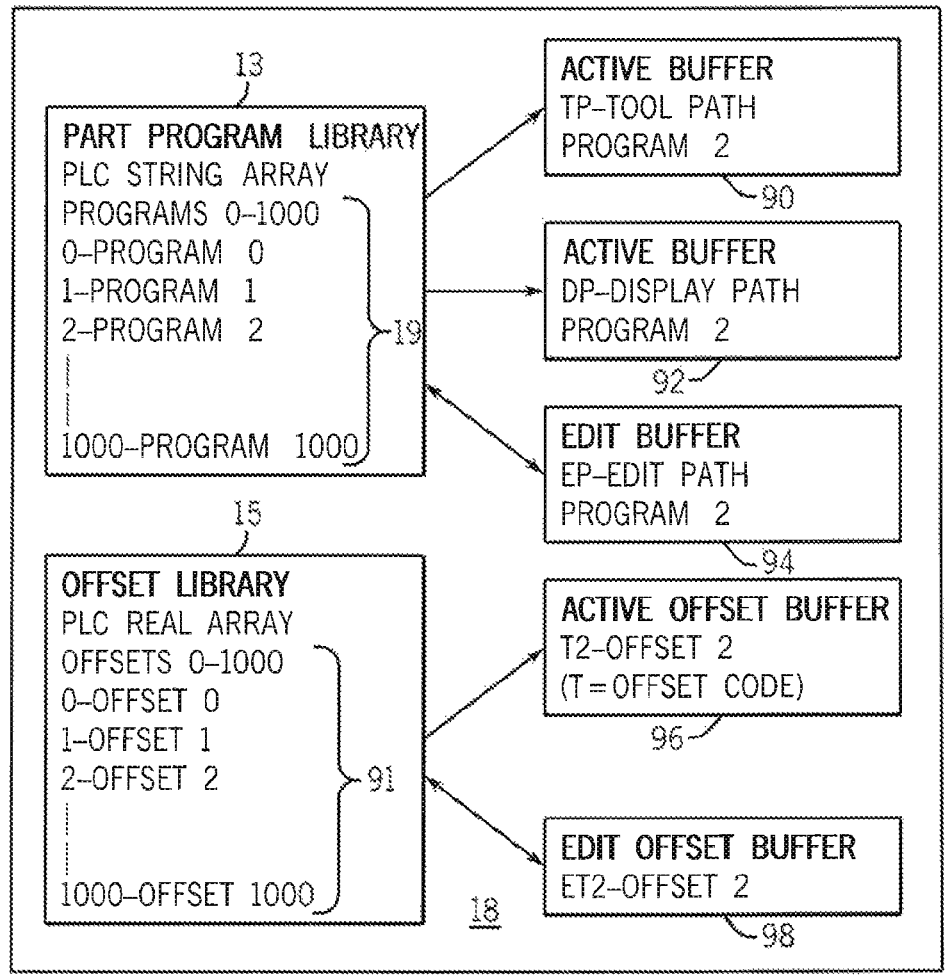
FIG. 9 is an exemplary block diagram showing in more detail various sub-portions of a memory portion of a PLC of the PNC system of FIG. 1.

Turning to FIG. 9, the memory portion 18 of the PLC 10 of FIG. 1 is shown in more detail, particularly in order to describe the particular manners in which the memory portion supports different types of operations of the PNC system 2 involving one or more of running a given one of the part programs 19 (e.g., causing one or more of the machine tools 8 to perform a process in accordance with such part program) and editing a given one of the part programs. With respect to running a part program, as discussed above, an operator can use the operator interface 12 to select a given one of the part programs 19 to run from the Program Manager screen 30 and, once the part program is selected, logic in the PLC 10 moves the selected part program from the part program library 13 of the memory portion 18 to various buffers in the memory portion 18, namely an active tool path (TP) buffer 90 and an active display path (DP) buffer 92.

In the present embodiment, the PLC 10 uses the active TP buffer 90 as the memory source for the part program 19 when decoding the part program to run. Further, the active DP buffer communicates the status of the active part program 19 from the PLC 10 to the operator interface 12 such that, while the PNC system 2 is running a process on the machine tool 8 in accordance with the active part program 19, each block of the part program can be displayed (and, at least in some embodiments, highlighted or accentuated) as it becomes active. Further, the active TP buffer 90 continues to be updated by the part program library 13 as the part program 19 is run. By comparison, when a given one of the part programs 19 is selected for editing, the PLC 10 loads the contents of the part program from the part program library 13 into an edit path (EP) buffer 94. The EP buffer 94 is the source of information displayed on the operator interface 12 for a part program undergoing editing via that operator interface, and also is the recipient of changes to the part program undergoing editing when those changes are entered by an operator.

Although the PNC system 2 is capable of running a given part program as well as allowing editing of a given part program as two distinct operations, the above-described components of the memory portion 18 allow also for simultaneous (or substantially simultaneous) performance of these operations as well. In particular, by utilizing the active TP buffer 90, the active DP buffer 92, and the EP buffer 94 that are distinct from one another (and particularly where the EP buffer is distinct from the other two buffers), it is possible for a part program to be edited by an operator in a manner that does not preclude continued running of the part program. This is because, at least temporarily, any changes to the part program entered by an operator via the operator interface 12 only influence the part program information stored in the EP buffer 94, rather than influencing the part program information stored in the active TP buffer 90 upon which the running of the part program is based.

Notwithstanding the above discussion, the EP buffer 94 does periodically communicate back to the part program library 13 to provide the part program library with any changes made to the part program undergoing editing, so that the part program as stored in the part program library is accordingly updated. Further, in the event that the part program of interest is being run simultaneously (or substantially simultaneously) while the editing is occurring, the active TP buffer 90 is periodically updated with modified portions of the part program from the part program library 13 as are being entered via the EP buffer 94. Also, in at least some embodiments, the operator interface 12 can allow an operator to modify more than one part program at a given time (e.g., by presenting different windows listing the different part programs). In at least some such embodiments, each (or portions of each) of the part programs undergoing editing are stored in a respective EP buffer, or at least stored in a respective location within the single EP buffer 94. By managing the storage of the part programs in this manner, it is possible for an operator to edit the different part programs independently of one another. For example, it is possible to edit only one of two different part programs that are running, or to edit a part program that is not running without affecting a different part program that is running.

Still referring to FIG. 9, as already discussed above, the operator also can enter various work, tool and geometric offsets to accommodate any given machine tool 8 (again, as discussed with respect to FIG. 5, these offsets can be entered using the operator interface 12). As shown, a variety of offsets 91 are stored in the offset library 15 (in a real number array) of the memory portion 18 of the PLC 10. Further, in the present embodiment, in addition to the offset library 15, the memory portion 18 also includes two additional buffers, namely, an active offset buffer 96 and an edit offset buffer 98, within which offsets associated with (or appropriate for, or needed by) specific part programs are stored when those part programs are being utilized for certain purposes. More particularly, the active offset buffer 96 and edit offset buffer 98 respectively allow respective offsets associated with respective part programs to be specially segregated in memory and easily accessed when those particular part programs are being run or edited, respectively.

For example, when a particular one of the part programs (e.g., a "Program 2" as shown in FIG. 9) is loaded from the part program library 13 into the active TP buffer 90 to allow for running of that part program (e.g., in controlling the performing of a process by one of the tools 8), a command in the part program (a T-code called "T2") triggers the loading of corresponding offset information associated with that part program (e.g., an "Offset 2") into the active offset buffer 96, thereby allowing the programming language to be associated with and incorporate the offsets. Additionally, when an operator selects a part program to be edited (again, for example, the "Program 2"), not only is the EP buffer 94 loaded with that program, but also the edit offset buffer 98 is loaded with the corresponding offsets associated with that program (again, for example, the "Offset 2"). Notwithstanding the above description, in at least some embodiments it is possible for offset information to be edited by an operator independently of the editing of any associated part program and, when this occurs, the offset information to be edited is loaded into the edit offset buffer 98 even though the corresponding part program is not loaded into the EP buffer 94.

As with the editing of part programs via the EP buffer, when edits are entered by an operator via the operator interface 12 that result in changes to offset information stored in the edit offset buffer 98, that information is then subsequently (e.g., on a periodic basis) communicated back to the offset library 15 such that the changes recorded in the edit offset buffer are copied to the offset library. To the extent that a given part program is being run while editing of offset information via the edit offset buffer 98 is occurring, upon the modified information being returned to the offset library 15, the offset library then sends the modified offset information (e.g., the current values) to the active offset buffer 96, thus allowing for "real-time" updating of the offsets being used by the part program being run. If a part program is not being run while the offset editing is occurring, the changes to the offsets will be moved into the offset library 15 alone, updating the offset library without disturbing any part program or any other offset library portions that are currently active (e.g., offset information associated with other part programs that are currently being run). The edit offset and active offset buffers 96, 98 thus provide an operator with an ability to enter or modify the offsets both before and after the start of a process on a machine tool 8. Additionally, edited offsets can be programmed to not go into effect immediately, but instead only when a specific condition is met.

Figure 10:
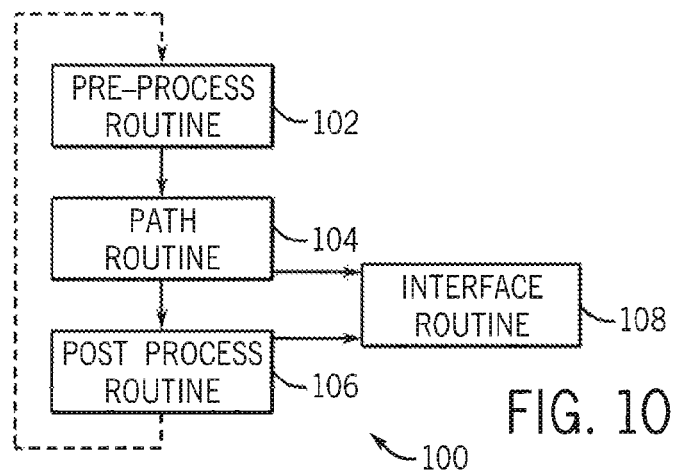
FIG. 10 is an exemplary flow diagram showing a process performed by a PLC of the PNC system of FIG. 1 when executing/running a part program.

Referring to FIG. 10, in the present embodiment, the PLC 10 of the PNC system 2 performs several routines in causing a part program stored in the memory portion 18 (particularly the active TP buffer 90) to be executed/run so that a desired operation is performed by a given one or more of the tools 8. As shown in FIG. 10, as illustrated by a flow chart 100, the PLC 10 in particular performs four routines, namely, a pre-process routine 102, a path routine 104, a post-process routine 106, and an interface routine 108. The sequence of the pre-process, path, and post-process routines 102, 104 and 106 generally continues in a cyclic manner as different portions/blocks of the part program are executed, until the last block of the program has been decoded, transferred into the motion instruction registers, and executed. In contrast, the interface routine 108 is performed generally simultaneously with the pre-process, path, and post-process routines 102, 104 and 106 and governs the interaction of the PLC 10 with one or more of the I/O control devices 6, and therefore with the machine output and input devices.

More particularly, the pre-process routine 102 is performed by the PLC 10 in order to decode each block of the string array that constitutes the part program, to identify each part program code letter and the associated numerical identifier and any position/coordinate axis codes (x, y, z, r, etc.), and store this information in a readable, executable manner. An exemplary form of the pre-process routine 102 is discussed further below in relation to FIG. 11. With respect to the path routine 104, that routine takes the pre-process data and executes it using motion instructions. For example, a standard motion instruction for a tool such as a "Motion Axis Move" (MAM) instruction can be used to instruct a servo to move a machine tool part to a position as specified by the part program. The position for the MAM instruction is identified by the associated axis coordinates (x, y, z) that were stored as real numbers in the path routine. Further, with respect to the post-process routine 106, in this routine the PLC 10 reads the pre-process data and recognizes any M-code commands that provide for a specific function that occurs at the end of a motion, for example, a command that machine coolant be turned off.

As for the interface routine 108, that routine is located in the main body of the ladder logic program 17, and serves to execute the part program on the machine tool 8 while the part program is being decoded and the motion instruction queue begins to fill. More particularly, the interface routine 108 translates the motion instructions to the I/O control devices 6 that activate the machine I/O devices to produce an action of the machine tool 8, that is, the routine provides the interface between the machine I/O devices (solenoids, servos, sensors, etc.) on the machine tool 8 and the PNC system 2. Typically, each I/O control device 6 has specific physical connection points that are identified by the interface routine 108 with specific I/O addresses in the ladder logic program. The physical connection point is hardwired or otherwise in communication with an appropriate machine I/O device on the machine tool 8.

For example, supposing that the I/O control device 6 is an output card, then that output card has a specific physical connection point that is identified, via ladder logic, by the interface routine with a specific output address. The physical connection point on the output card is hardwired or otherwise in communication with a machine output device related to a machine tool 8 output component, such as an x-axis servo on a drill arm. When a motion instruction requests that the x-axis servo on the drill arm be moved to a specific point, the interface routine recognizes that the instruction should be sent to the associated output address to produce the desired movement of the x-axis servo. Also for example, supposing that the I/O control device 6 is an input card, then that I/O control device has a specific physical connection point that is identified by the interface routine with a specific input address. The physical connection point on the input card is hardwired or otherwise in communication with a machine input device related to the machine tool 8, for example a proximity sensor, flow switch or contactor. Additionally, an input address can be accessed by the interface routine 108 to provide feedback data for one or more motion instructions.

Figure 11:
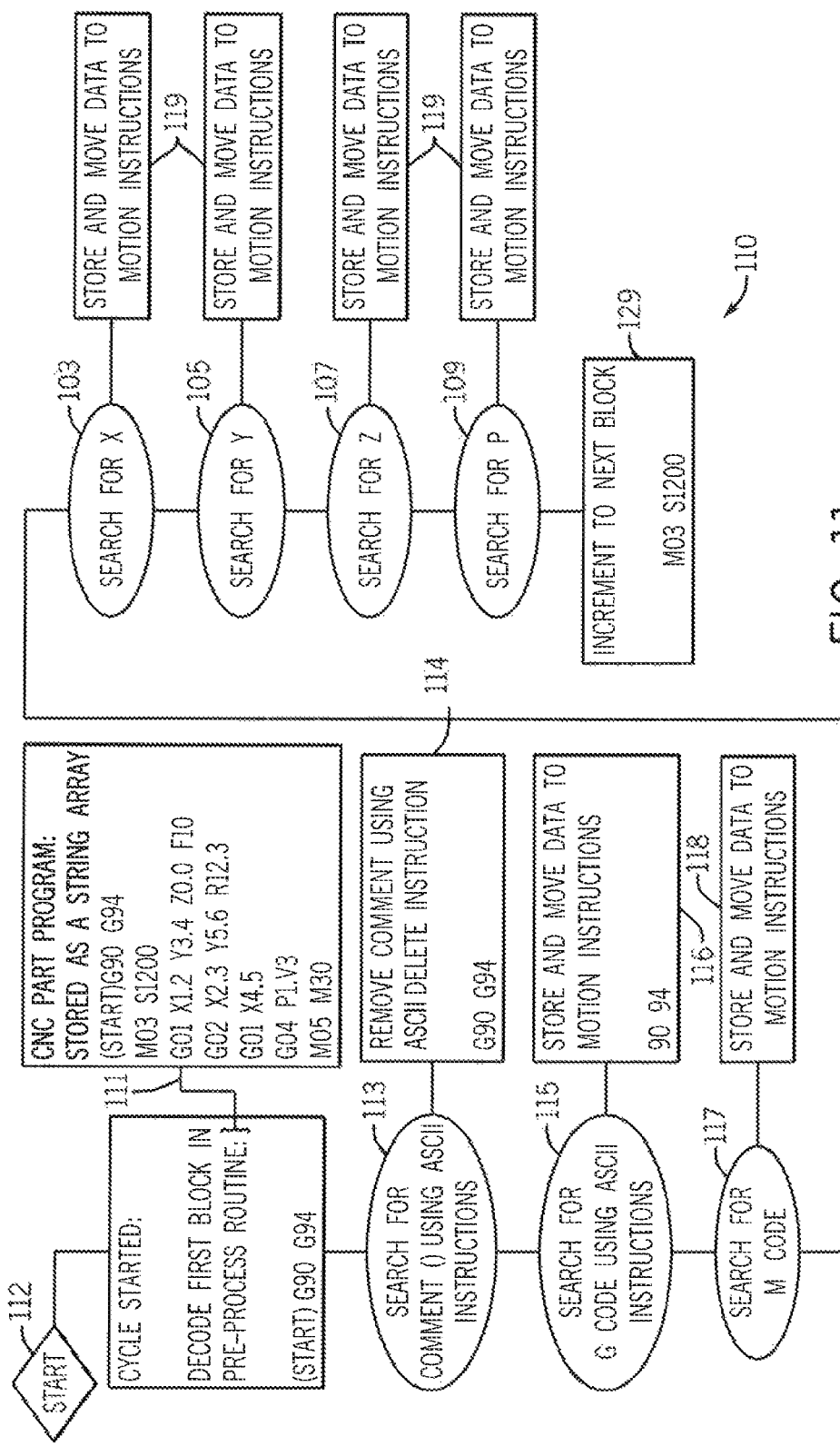
FIG. 11 is an additional exemplary flow diagram showing a pre-process decoding algorithm employed by the PLC as part of the process shown in FIG. 10.

In order for the PNC system 2 to run a given one of the part programs 19, the PLC 10 in particular performs the pre-process routine 102 so that the part program of interest stored in the memory portion 18 (e.g., within the active TP buffer 90), which is in the form of a string array, is converted into a form that is recognizable and executable by the ladder logic 17 of the PLC 10. Referring now to FIG. 11, an exemplary flow diagram is provided showing an exemplary pre-process decoding algorithm 110 that in at least one embodiment is performed by the PLC 10 as the pre-process routine 102 of FIG. 10. In the present embodiment, the pre-process decoding algorithm 110 uses ASCII instructions to translate an exemplary part program 111 into axes positions and motion instructions. In general, this is accomplished by searching for individual command codes, such as standard M and G codes, and any associated axes positions, that are located in a particular block of the string array constituting the part program 111, which is stored in the active TP buffer 90. When a code is found that has numerical data such as x-axis, y-axis, and z-axis coordinates, a "string-to-real" instruction is performed to store and transfer the numerical data to the path routine.

As shown, the algorithm 110 commences at a step 112 in which the operator presses a start button at the operator interface 12 in relation to the part program 111 (for example the cycle start button 47, as shown on FIG. 4). Engaging the start button activates the decoding of the string array that constitutes the part program 111, which is stored in the active TP buffer 90 (due to earlier selection of the part program by the operator). Once started, the PLC 10 according to the algorithm 110 at a step 113 then looks to the first block (e.g., a first line) of the part program 111 and searches for any comment in the block and if found, deletes it, as represented by a box 114. In the particular example shown, the comment "(START)" is removed from the first block "(START)G90 G94" of the part program 111, leaving only the statement "G90 G94".

Next, at successive steps 115 and 117 of the algorithm 110, the PLC 10 then continues to analyze the first block of the part program 111 and searches for command codes, namely, G-codes or M-codes. If a G-code is found at the step 115, then at a box 116 the PLC 10 processes the codes by removing the "G's" from the G-code. For example, as shown in the box 116, the G-codes "G90 G94" are processed to result in the codes "90 94". Further, upon the completion of this processing at the box 116, the resulting G-code information is stored in a register in the memory portion 18 and the data is then moved to the motion instructions for use in by the path routine 104. Likewise, if a M-code is found at the step 117, then at a box 118 the PLC 10 processes the codes by removing the "M's" from the M-code, and then the resulting M-code information is stored in a register in the memory portion 18 and the data is then moved to the motion instructions for use in by the path routine 104.

When a command code is found, it will often, although not always, have associated position codes in the form of string numbers. As shown in FIG. 11, subsequent to the step 117 the PLC 10 performs additional steps 103, 105, 107 and 109 of the algorithm 110 in which the PLC searches for string numbers that constitute x, y, z and p position codes. When such position codes are identified, the position codes are translated to real numbers and the information is then stored in a register, as indicated by boxes 119 corresponding to each of the steps 103, 105, 107 and 109. Also as represented by the boxes 119, the PLC 10 then further reads the pre-process data and begins generating motion instructions with the data, thereby building a queue of motion instructions in the memory portion 18, to be communicated to the interface routine 108 for execution.

Once the position codes have been searched for and processed as appropriate, at a step 129 the algorithm 110 increments to the next block of the part program 111, that is, returns to the step 113 (in this example, the PLC 10 next begins to analyze the second line of code, "M03 S1200"). Thus the PLC 10 repeatedly performs the algorithm 110 for each line of the part program 111 until the entire part program has been reviewed and processed. It should be noted that the algorithm 110 is merely intended to be exemplary and that, in other embodiments, additional processing steps can be performed and/or one or more of the steps that are shown can be rearranged in their order (for example, steps 115 and 117 can be reversed in order). Also, in some cases, one or more of the steps are performed simultaneously (or substantially simultaneously). For example, in some circumstances, the searching for position codes (e.g., the steps 103, 105, 107 and 109) occurs as part of the searching for command codes (e.g., the steps 115 and 117). Further, other variables such as spindle speed for example can also be searched and registered similar to the position codes.

In at least one embodiment, the pre-process routine logic represented by the algorithm 110 (or other pre-processing logic) is designated in the PLC 10 to be processed by the processor portion 16 at a speed that is approximately 8 times faster than the processing of the logic for other tasks, such as the interface routine logic. In one such embodiment, for example, the pre-process routine is a periodic task that runs about every 2.5 milliseconds, whereas the interface logic is a periodic task that runs about every 20 milliseconds. The increased processing speed of the pre-process routine, as compared to the interface routine, results in the motion queue, with the motion queue providing the operator the ability to control a stage of a process after it has been decoded into the PLC, but before it has occurred. Also, as previously discussed, the part program 111 can be edited while the part program is running. More specifically, if a part program is running and the operator edits a coordinate such as an x-axis value, the process will be updated in "real-time" such that the next time the motion instruction looks to the register holding the x-axis value, it will find and use the updated value.

Figure 12:
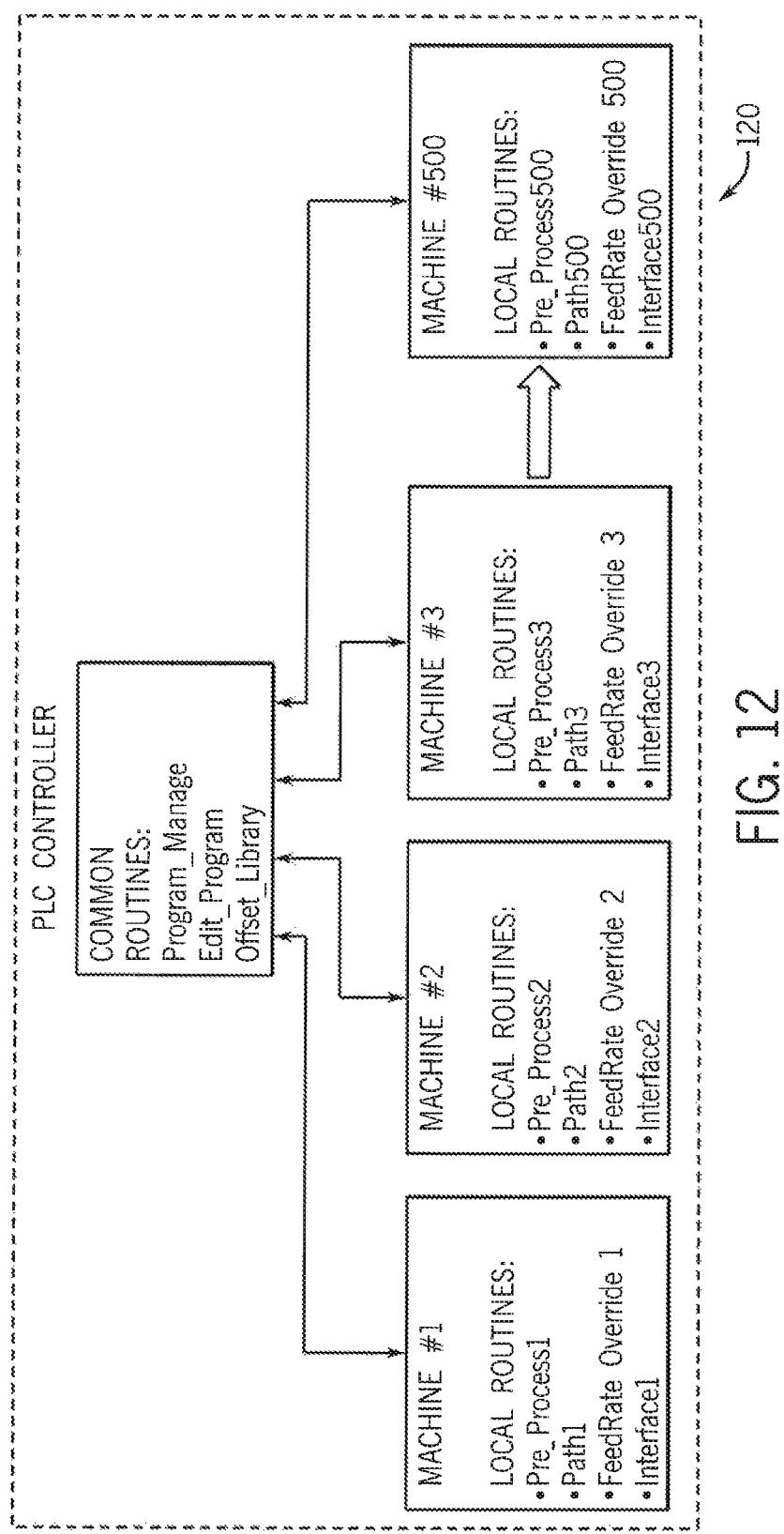
FIG. 12 is an exemplary block diagram depicting in schematic form the control of multiple machine tools by a single PNC system such as that of FIG. 1.

As discussed above, the PNC system 2 can be used to control multiple machine tools 8 and run multiple part programs/processes either simultaneously or sequentially. Referring to FIG. 12, in one embodiment where one or more part programs have been selected to be run on multiple machine tools 8, the PNC system 2 can establish local routines (pre-process, path, etc.) for each machine tool 8 that can be processed simultaneously, while common routines (program manage, edit program, edit offsets etc.) are shared by all the selected machine tools 8.

Although the above description is intended to be illustrative of certain embodiments of the present invention, the present invention is also intended to encompass a variety of other embodiments as well. For example, in at least one embodiment, the operator or a part program programmer can add various math functions to a part program block for processing by the PNC system. These functions can use data previously inputted or can prompt for data from the operator when the process is at a certain point. In one embodiment, the math functions supported include, for example, addition, subtraction, multiplication, division, sine, and cosine. By providing access to math functions that can be processed as part of the part program, the PNC system 2 allows the operator and programmer more flexibility in executing an intended process.

Further in at least some embodiments, the PNC system 2 includes the ability to use the PLC 10 to interpolate multiple axes in a process, such as interpolating a w-axis (used for the position to hold the tailstock of a workpiece in place) with an x-axis and z-axis, such that the servos on a machine tool 8 can, for example, simultaneously move the tailstock of a workpiece and position a drill arm for use on the workpiece. Embodiments of the present invention are intended to encompass a variety of processes run on various types of industrial machine tools. Likewise, the present invention is also intended to encompass embodiments having a variety of different types of components in addition to or other than those discussed in detail above.

Further, in at least some embodiments, the present invention can be part of a "safety system" used to protect human life and limb in an industrial or other environment. Nevertheless, the term "safety" as used herein is not a representation that the present invention will make an industrial or other process safe or that other systems will produce unsafe operation. Safety in an industrial or other process depends on a wide variety of factors outside of the scope of the present invention including, for example: design of the safety system, installation and maintenance of the components of the safety system, and the cooperation and training of individuals using the safety system. Although the present invention is intended to be highly reliable, all physical systems are susceptible to failure and provision must be made for such failure.

It is specifically intended that the present invention not be limited to the embodiments and illustrations contained herein, but include modified forms of those embodiments including portions of the embodiments and combinations of elements of different embodiments as come within the scope of the following claims.

I claim:

1. A method of controlling a controlled device, the method comprising:
   receiving at least one part program at a programmable logic controller (PLC);
   storing the at least one part program in a string array library of a memory portion of the PLC;
   communicating information to an operator interface regarding the stored at least one part program;
   receiving a first selection signal at the operator interface indicating a first selection of a first of the at least one part program and communicating the first selection to the PLC;
   copying the selected part program to an active program buffer of the memory portion;
   receiving a second selection signal at the operator interface indicating a second selection of a machine tool that is to perform a process in accordance with the selected part program;
   decoding the selected part program into commands and associated real value axis positions;
   storing the commands and associated real value axis positions and generating instructions to execute the commands; and
   communicating the commands and associated real value axis positions at least indirectly to both the operator interface and machine tool, so that the machine tool operates based upon the selected part program and so that a representation of an execution of the selected part program is displayed at the operator interface.

2. The method of claim 1, further comprising modifying the at least one of a selected part program and an unselected part program during machine tool operation.

3. A method of controlling a machine tool, the method comprising:
   receiving at least one part program at a programmable logic controller (PLC);
   storing the at least one part program in a string array library of a memory portion of the PLC;
   receiving a first selection signal at the operator interface indicating a first selection of a first of the at least one part program and communicating the first selection to the PLC;
   decoding the selected part program into commands and associated real value axis positions;
   storing the commands and associated real value axis positions and generating instructions to execute the commands;
   communicating the commands and associated real value axis positions at least indirectly to both the operator interface and machine tool, so that the machine tool operates based upon the selected part program and so that a representation of an execution of the selected part program is displayed at the operator interface; and
   receiving a second selection signal at the operator interface indicating a second selection of a machine tool that is to perform a process in accordance with the selected part program.

4. The method of claim 3, wherein a plurality of part programs including the at least one part program are received at the PLC, and wherein the communicating includes receiving a selection signal at the operator interface indicating that the first of the at least one part program should be run so that the first machine tool is operated in accordance with the first of the at least one part program.

5. The method of claim 4, further comprising:
   displaying at least one block of the first of the at least one part program on the operator interface.

6. A method of controlling a machine tool, the method comprising:
   storing a first part program in a part program library of a memory portion of a programmable automation controller (PAC) configured to interface with a machine tool, and storing a plurality of part programs including the first part program in the form of string arrays in the memory portion of the PAC upon receipt of the plurality of part programs at the programmable automation controller (PAC);
   decoding the first part program into commands and associated real number axis coordinates after a receipt of a first selection of the first part program; and storing the commands and associated real number axis coordinates for execution of the first part program, wherein the PAC is capable of segregating and storing the plurality of part programs, wherein the segregating includes assigning each of the part programs to a distinct location in the part program library.

7. The method of claim 6, wherein the storing of the first part program in the part program library of the memory portion of the PAC includes the storing of the first part program in the form of a string array.

8. The method of claim 7, wherein the PAC is capable of communicating the commands and associated real number axis coordinates at least indirectly to at least one of an operator interface and the machine tool.

9. The method of claim 8, wherein the commands and associated real number axis coordinates communicatable by the PAC are interpretable in the form of a graphical representation of an execution of the selected first part program for display at the operator interface.

10. The method of claim 6, wherein the memory portion further includes an offset library comprising a real number array.

11. The method of claim 6, wherein the PAC is capable of receiving a first selection signal to indicate the selection of the first part program for execution.

12. A method of controlling a machine tool, the method comprising:

providing a programmable automation controller (PAC) having a memory portion with a part program library configured to receive a first part program in at least one string array, wherein the first part program includes parameters for guiding a machine tool;

allocating an active tool path buffer and an active display path buffer in the memory portion, wherein the active tool path buffer is configured to serve as a memory source for the first part program when decoding the first part program for execution, and wherein the active display path buffer is capable of communicating a status of the first part program during execution of the first part program;

allocating one or more edit path buffers in the memory portion, wherein a copy of the first part program is receivable into at least one edit path buffer, and wherein the edit path buffer is capable of providing the first part program for display on an interface and for receiving inputs from the interface to modify the first part program;

configuring the active tool path buffer, the active display path buffer, the edit path buffer to allow for simultaneous execution and editing of the first part program; and communicating commands based upon the first part program at least indirectly to both the interface and machine tool, so that the machine tool operates based upon the first part program and so that a representation of the execution of the first part program is displayed at the interface.

13. The method of claim 12, further comprising:

receiving two or more part programs including the first part program into distinct edit path buffers in the memory portion; and receiving a selection signal at the interface indicating that the first part program should be run so that the first machine tool is operated in accordance with the first part program.

14. The method of claim 12, further comprising:

providing an offset library real number array in the memory portion for receiving offset inputs capable of modifying the execution of the part program.

15. The method of claim 14, further comprising:

allocating one or more active offset buffers in the memory portion for receiving offset data associated with the part program.

16. The method of claim 15, further comprising:

allocating one or more edit offset buffers configured to allow for the simultaneous operations of providing offset data for use with the part program and editing the stored offset data associated with the part program during operation of the part program.

17. The method of claim 12, wherein the communicating further includes communicating of real number axis coordinates as decoded from the first part program.

* * * * *